United States Patent [19]

Fujimoto et al.

[11] Patent Number: 4,507,260

[45] Date of Patent: Mar. 26, 1985

[54] RAIL APPARATUS AROUND REACTOR PRESSURE VESSEL

[75] Inventors: Hirotsugu Fujimoto; Tatsukuma Hosono; Hiroshi Kimura; Sadao Shibuya; Akisuke Naruse, all of Hitachi, Japan

[73] Assignees: Hitachi, Ltd., Tokyo; Hitachi Engineering Co., Ltd., Hitachi, both of Japan

[21] Appl. No.: 366,213

[22] Filed: Apr. 7, 1982

[30] Foreign Application Priority Data

Apr. 8, 1981 [JP] Japan ................................. 56-53688

[51] Int. Cl.³ ............................................. G21C 17/00
[52] U.S. Cl. .................................... 376/249; 376/245; 376/260
[58] Field of Search ................ 376/249, 260, 287–291, 376/245

[56] References Cited

U.S. PATENT DOCUMENTS 4,299,656  11/1981  Weber et al. ........................ 376/249
4,336,104  6/1982  Figlhuber et al. ................... 376/249

FOREIGN PATENT DOCUMENTS 2506415  8/1976  Fed. Rep. of Germany ...... 376/249
2609541  9/1977  Fed. Rep. of Germany ...... 376/249
2620715  11/1977  Fed. Rep. of Germany ...... 376/249
2709023  9/1978  Fed. Rep. of Germany ...... 376/249
2834108  12/1979  Fed. Rep. of Germany ...... 376/249

OTHER PUBLICATIONS

Conf. on Periodic Inspection of Pressure Vessels, S 30450060, London, England, (5/11/72), pp. 205–220, Lautzenheiser.

*Primary Examiner*—Sal Cangialosi
*Attorney, Agent, or Firm*—Beall Law Offices

[57] ABSTRACT

A rail apparatus positioned around the surface of a reactor pressure vessel surfaces (1) for carrying equipment such as a flaw detector to permit the equipment to move along the surface of a reactor pressure vessel in the vertical and circumferential directions. The rail apparatus has a plurality of vertical rails (81) and at least one circumferential rail (82) connected to the vertical rails through turn tables (83) at respective points of intersection. Each vertical rail (81) is supported by a supporting member wall fixed at its one end to a gamma-ray shielding wall (2) surrounding the reactor pressure vessel. The vertical and circumferential rails as a unit are retained by the gamma-ray shielding member (84) through oscillation prevention means (86).

20 Claims, 7 Drawing Figures

RAIL APPARATUS AROUND REACTOR PRESSURE VESSEL

BACKGROUND OF THE INVENTION

FIELD OF THE INVENTION

The present invention relates to a rail apparatus around a nuclear reactor pressure vessel and, more particularly, to a rail apparatus on which a device such as an inspection device is carried to more along the surface of the reactor pressure vessel in the vertical and the circumferential directions.

For inspecting the surface of the reactor pressure vessel with, for example, an ultrasonic flaw detector, the ultrasonic flaw detector is movably carried on rails laid around the surface of the reactor pressure vessel to detect any flaw existing in the surface of the same.

DESCRIPTION OF THE PRIOR ART

Figure 1:
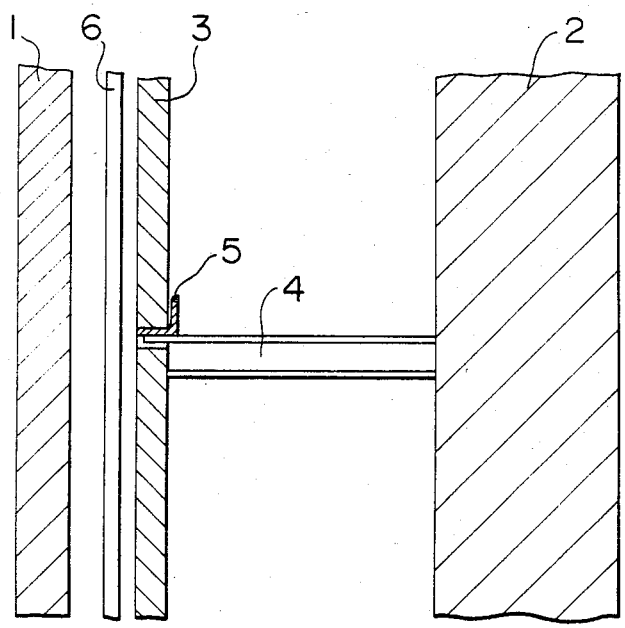
FIG. 1 is a sectional view of a part of a reactor pressure vessel, showing particularly the positioning of a conventional rail apparatus around the vessel surface.

FIG. 1 illustrates a conventional arrangement of a rail apparatus around the pressure vessel surface of a nuclear reactor, for inspecting flaws over the surface of the reactor pressure vessel. The nuclear reactor has a pressure vessel 1 and a gamma-ray shield wall 2. A bracket 4 is fixed at its one end to the gamma-ray shielding wall 2. A heat insulator wall 3 is supported on the other end of the bracket 4 by a support 5. A rail 6 (only a vertical rail is shown in FIG. 1) is disposed between the pressure vessel 1 and the heat insulator wall 3.

Figure 2:
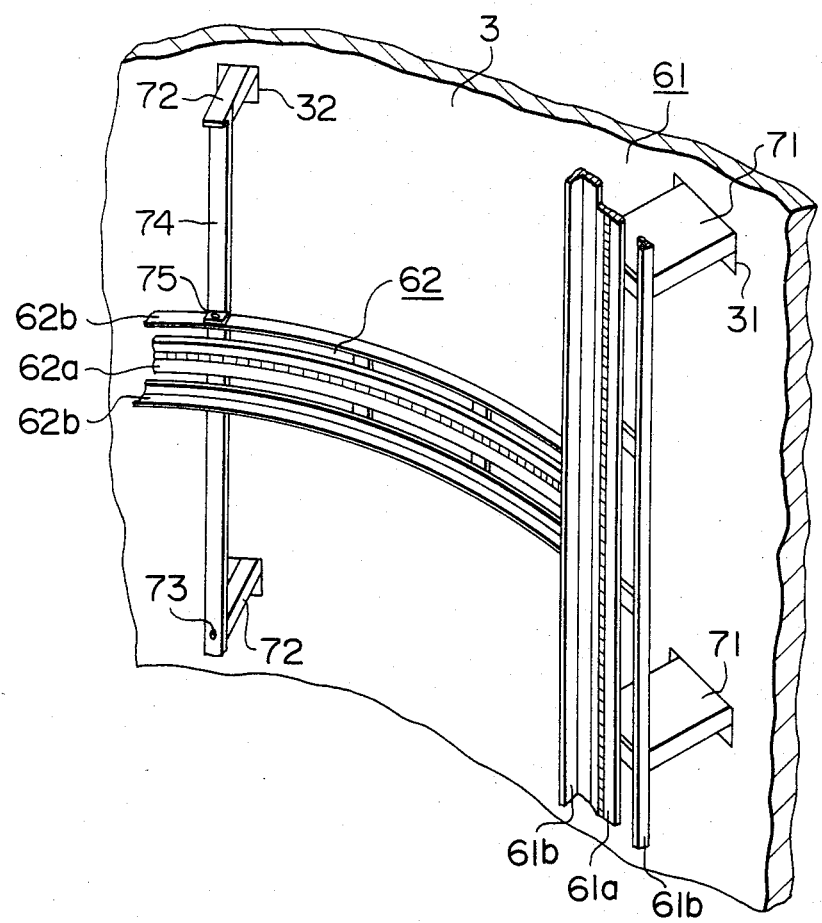
FIG. 2 is a perspective view of an essential part of the conventional rail apparatus.

Referring now to FIG. 2 which shows the detail of the rail apparatus, a vertical rail 61 is constituted by a central guide 61a and side guides 61b disposed at both sides of the central guide 61a. The central guide 61a is provided with a rack adapted to be engaged with a pinion mounted on an ultrasonic flaw detector. The vertical rail 6 is supported through a thermal expansion relief section (not shown) by a rail supporting bracket 71 which projects through a hole 31 formed in the heat insulator wall 3. A circumferential rail 62 is constituted, as in the case of the vertical rail 61, by a central guide 62a and side guides 62b provided at both sides of the central guide 62a. The circumferential rail 62 is supported through a circumferential thermal expansion relief section 75 to a rail support 74. The rail support 74 is supported at its upper end by a rail support bracket 72 projecting through a hole 32 formed in the heat insulator wall 3 while the lower end thereof is carried through a vertical thermal expansion relief portion 73.

These rails are heated to a temperature around 300° C. during the operation of the plant. These rails, however, are cooled down almost to the room temperature while the operation of the plant is suspended for the of ultrasonic flaw detection or the like purpose. In addition, since the flaw detection has to be conducted under a radioactive circumstance, the vertical rails and the circumferential rails are supported by independent supports. This arrangement inconveniently requires an impractically large number of parts and complicated construction of the supports, in order to maintain a precise distance between adjacent rails or to preserve a constant curvature of the circumferential rail, because the rails themselves are not rigid enough.

It is not allowed to support the rails directly by the reactor pressure vessel, because the reactor pressure vessel is quite an important item of equipment. Insteadly, the rails are supported through brackets by the gamma-ray shielding wall disposed at the outside of the heat insulator wall. In consequence, heat leaks uneconomically at a high rate through the holes for the support brackets formed in the heat insulator wall.

SUMMARY OF THE INVENTION

Accordingly, an object of the invention is to provide a rail apparatus having a simplified construction which can decrease the leakage of heat while eliminating the influence of thermal expansion, to thereby overcome the above-described problems of the prior art.

To this end, according to the invention, there is provided a rail apparatus for carrying a flaw detector or the like equipment around the surface of a nuclear reactor pressure vessel in the vertical and circumferential directions, the rail apparatus having an integral construction including vertical rails supported by supporting members which are fixed at their one ends to a gamma-ray shielding member surrounding the peripheral surface of the pressure vessel, and at least one circumferential rail connected to the vertical rails through turn tables, the rail apparatus as a whole being supported by the gamma-ray shielding member through an oscillation prevention means.

Namely, according to the invention, the aforementioned object is achieved by integrally combining, through turn tables, the vertical rails and the circumferential rails which are supported independently of each other in the conventional arrangement.

DESCRIPTION OF THE PREFERRED EMBODIMENTS

Figure 3:
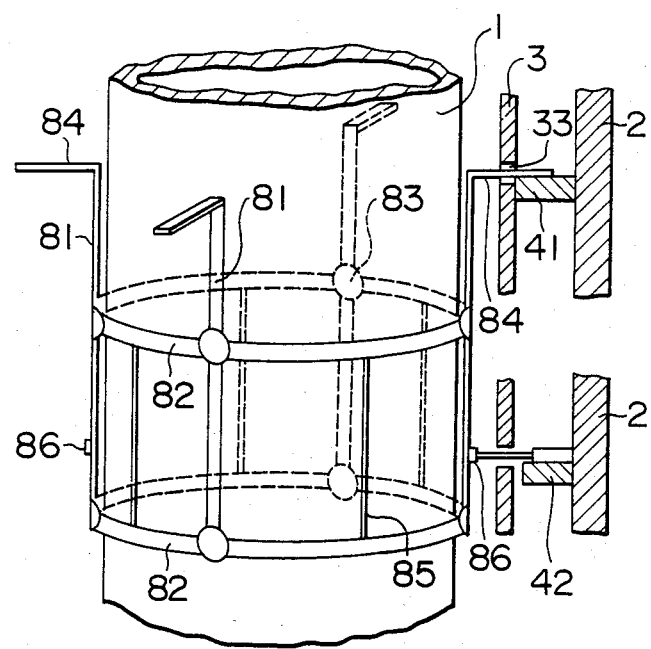
FIG. 3 is a perspective view of a rail apparatus around a reactor pressure vessel surface, constructed in accordance with an embodiment of the invention.
Figure 4:
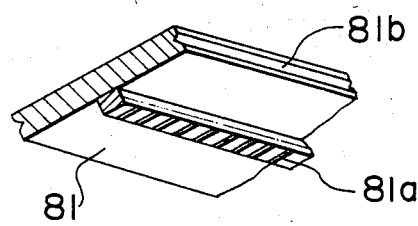
FIG. 4 is a perspective view of an essential part of the rail apparatus shown in FIG. 3.

FIG. 3 is a perspective view of an embodiment of the invention, while FIG. 4 is a perspective view of the rail of an essential part of the embodiment shown in FIG. 3. In these Figures, the same reference numerals are used to denote the same parts or members as those in FIGS. 1 and 2.

This embodiment is a rail apparatus for an ultrasonic flaw detector for inspecting the welding line of the pressure vessel of a nuclear reactor. In this case, it is necessary to provide a rail for each of the welding lines. The rail apparatus, therefore, has a plurality of vertical rails and circumferential rails, which are designated at reference numerals 81 and 82 respectively. As shown in FIG. 4, each of the rails 81 and 82 is provided with a rack 81a for engaging a pinion on the ultrasonic flaw detector and grooves 81b for a chain and a roller guide. The vertical rails 81 and the circumferential rails 82 are connected at each point of intersection by a turn table 83, so that the ultrasonic flaw detector can be transferred to any point of the rail apparatus. The vertical rails 81 are disposed at such positions as to divide the circumference into four sections of an equal length. The upper end of each vertical rail is supported by one end of a supporting portion 84 which is fixed at its other end to a support 41 secured at its one end to the gamma-ray shielding wall 2, while the other end of the supporting portion 84 is extended inwardly of the heat insulator wall 3 through a hole 33 formed in the latter. The circumferential rails 82, 82 are connected to each other by a plurality of vertical reinforcement supports 85. Anti-earthquake oscillation prevention devices 86 are provided on the vertical rails 81 and retained by the support members 42 fixed to the gamma-ray shielding wall 2.

Thus, the rail apparatus of this embodiment has a cage-like construction consisting of circumferential rails 82 each being made integral by means of turn tables 83, and vertical rails 81 and reinforcement supports 85 connected between the circumferential rails 82. This cage-like rail apparatus as a whole is supported by supporting portions 84 and the oscillation prevention devices 86.

In this rail apparatus, since each circumferential rail has an integral ring-like form, the thermal expansion of the circumferential rail in the high operating temperature can be treated as a radial expansion, in contrast to the conventional arrangement in which the thermal expansion appears in the circumferential direction. Namely, according to the described arrangement of the invention, the amount of thermal expansion is decreased into $1/\pi$ of the circumferential expansion (the ratio of the radial expansion to the half of the circumferential expansion). Therefore, provided that a sufficiently large distance is preserved between the supporting portion 84 and the circumferential rail 82, it is possible to absorb the thermal expansion of the circumferential rail 82 thanks to the resiliency of the vertical rails 81 and the reinforcement supports 85, even if the supporting portion 84 is fixed. In addition, by locating the oscillation prevention devices 86 at suitable positions between the circumferential rails, the vertical elongations of the vertical rails are relieved by the similar method as the conventional method.

It is, therefore, possible to reduce the number of the supporting portions and the construction of the supporting structure is simplified as compared with the conventional arrangement in which a supporting portion is provided for each rail. In consequence, the number of portions penetrating the heat insulator wall is decreased to reduce the rate of leak of the heat. In addition, since the rail apparatus as a whole has an integrated construction, there is greater freedom for the selection of positions of the supporting portions and the oscillation prevention device. It is also possible to make use of the support for the temperature preservation member as a support for the rail apparatus. In consequence, the leak is advantageously decreased.

The portions supporting the whole of the rail apparatus are fixed perfectly so that it can maintain predetermined precision against repeated changes in the temperature and the installation is facilitated also.

Figure 5A:
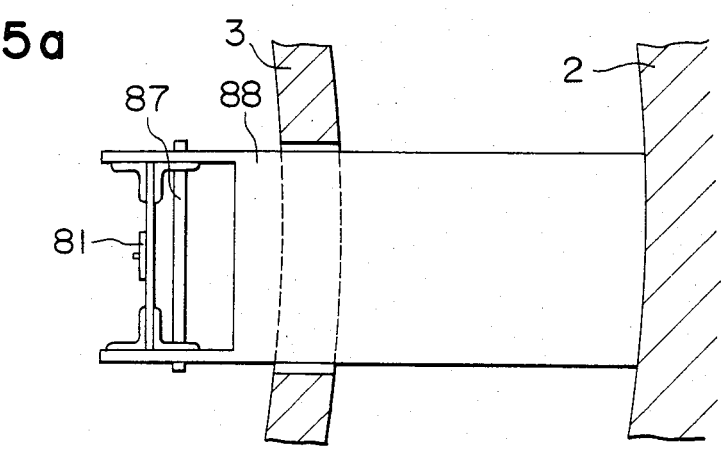
FIGS. 5a and 5b are a plan view and a side elevational view of an essential part of another embodiment of the invention respectively.
Figure 5B:
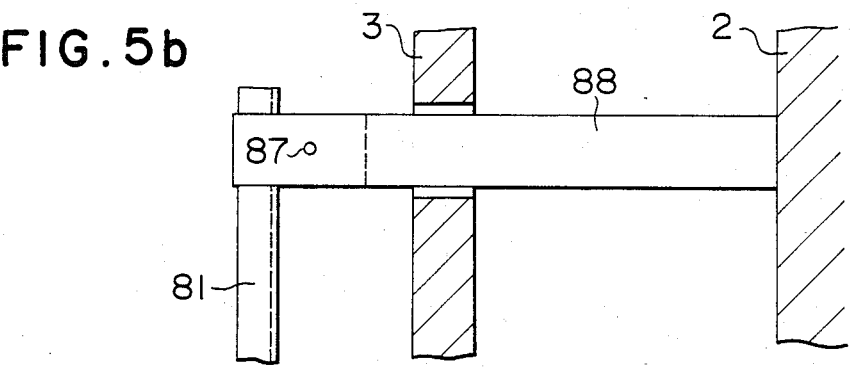

FIGS. 5a and 5b are a plan view and a side elevational view of an essential part of another embodiment. In this embodiment, each vertical rail 81 is supported, through a pin 87, by a supporting portion 88 which is secured at its one end to the gamma-ray shielding wall 2 and projecting to the inside of the heat insulator wall 3 through a hole formed in the latter. According to this arrangement, the degree of freedom is increased to effectively suppress the stress. In the embodiment shown in FIG. 3, in which the supporting portions and the oscillation prevention means are fixed, there is a fear that the stress may undesirably exceed the limit value unless a sufficiently large distance is preserved between the thermally expansible rails and the supporting portions and the oscillation prevention means. This problem, however, is overcome by the arrangement of the embodiment shown in FIG. 5. The problem of lack of stability and precision can be overcome by decreasing the distance. This embodiment, therefore, can effectively be used in the case where the circumstances do not allow preservation of a sufficiently large distance.

It is possible to use, as the oscillation prevention means, a thermal expansion absorbing construction using a spring which acts rigidly against dynamic load such as that caused by an earthquake but absorbs static expansion such as thermal expansion. This arrangement facilitates the design of mounting position or the like, when a multiplicity of circumferential rails are used in stages.

Figure 6:
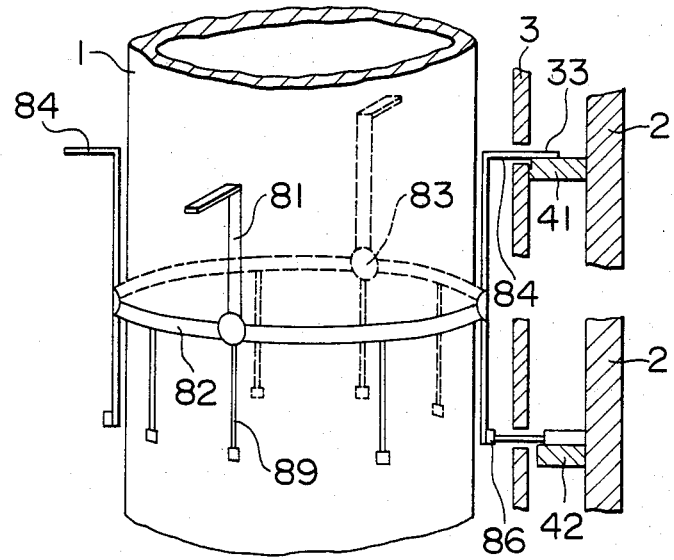
FIG. 6 is a perspective view of a further embodiment of the invention.

FIG. 6 is a perspective view of another embodiment of the invention in which the same reference numerals are used to denote the same parts or members as those in FIG. 3. In this embodiment, a plurality of reinforcement supports 89 are suspended from the circumferential rail 82 and are provided at their lower ends with oscillation prevention means 86. By using such reinforcement supports, it is possible to construct the rail apparatus using only one circumferential rail.

In the embodiments described hereinbefore, each vertical rail is integral with the supporting member which is fixed at its one end to the gamma-ray shielding wall. This, however, is not exclusive and the supporting member fixed at its one end to the gamma-ray shielding wall may be used as a rail support which supports both the vertical rail and the circumferential rail.

It will be understood by those skilled in the art that rail apparatus of the described embodiments permits an easy settling of the problem caused by the thermal expansion because the whole part of the rail apparatus is held as a unit. In addition, the uneconomical leak of heat is decreased by a reduction in the number of the supporting portions. Furthermore, the design and the installation are facilitated to improve the precision.

As has been described, according to the invention, it is possible to obtain a rail apparatus around a reactor pressure vessel surface having a simplified construction but still capable of eliminating the unfavourable influence of thermal expansion while decreasing the rate of leakage of heat, to a great advantae in the field of industry concerned.

What is claimed is:

1. A rail apparatus for carrying equipment along the surface of a nuclear pressure vessel, comprising:
   a plurality of vertical rails and supporting members connected to the upper ends of the vertical rails, each of said vertical rails being supported by one of said supporting members having one end portion fixed to a gamma-ray shielding member surrounding a nuclear pressure vessel,
   a circumferential rail disposed to align with said vertical rails,
   a plurality of turn tables by which said circumferential rail is connected to said vertical rails at a plurality of junctions substantially spaced apart from said upper ends of the vertical rails to form an integrated rail construction, and means for preventing oscillation and for connecting said rail construction to said gamma-ray shielding member.

2. A rail apparatus around a nuclear pressure vessel surface as claimed in claim 1, wherein each of said supporting members includes a pin and each of said vertical rails are supported, through the corresponding pin, by a supporting member fixed to said gamma-ray shielding member.

3. A rail apparatus around a nuclear pressure vessel surface as claimed in claim 1, further comprised of a plurality of sub-supporting members extending downwardly from said circumferential rail and wherein said oscillation prevention means are provided at the lower portions of said sub-supporting members.

4. A rail apparatus as claimed in claim 1, wherein said circumferential rail has a ring-like shape whereby thermal expansion of said circumferential rail occurs in directions extending radially outwardly from the surface of the nuclear pressure vessel.

5. A rail apparatus for carrying equipment along the surface of a nuclear pressure vessel, comprising:
first rail means disposed along parallel longitudinal axes spaced apart from the surface of a nuclear pressure vessel, for conducting an equipment carriage along said longitudinal axes;
second rail means intersecting said first rail means at a plurality of junctions, for conducting said equipment carriage circumferentially around said surface between said longitudinal axes;
means for interconnecting said first rail means to said second rail means at each of said plurality of junctions and for transferring said equipment carriage between said first rail means and said second rail means; and
means including radially extending members joined to said first rail means at locations substantially spaced apart from said junctions, for supporting said first rail means and said second rail means.

6. The rail apparatus of claim 5, wherein said first rail means comprises a plurality of elongate, resilient rails extending from said radially extending members and said junctions.

7. The rail apparatus of claim 6 wherein said radially extending members are connected to the upper ends of different ones of said plurality of elongate rails.

8. The rail apparatus of claim 6 wherein said radially extending members have first ends connected to the upper ends of different ones of said plurality of elongate rails and second ends disposed radially outwardly from said elongate members.

9. The rail apparatus of claim 8, wherein said support means further comprises a plurality of fastener means for pivotally joining said radially extending members to the upper ends of individual ones of said plurality of elongate rails.

10. The rail apparatus of claim 6, wherein said support means further comprises means joined to said elongate rails at positions substantially spaced apart from said junctions and substantially spaced apart from said radially extending members, for preventing oscillation of said elongate rails and said second rail means.

11. The rail apparatus of claim 6, wherein said support means further comprises means joined to said second rail means at positions substantially spaced apart from said radially extending members, for preventing oscillation of said elongate rails and said second rail means.

12. The rail apparatus of claim 5, wherein said second rail means comprises a plurality of spaced apart rails circumferentially surrounding said surface of the pressure vessel.

13. The rail apparatus of claim 12, wherein said rails have integral, ring-like shapes whereby thermal expansion of said rails occurs in directions extending radially outwardly from said surface of the pressure vessel.

14. The rail apparatus of claim 5, wherein said second rail means comprises a single rail circumferential encircling said surface of said pressure vessel.

15. The rail apparatus of claim 14, wherein said rail has an integral, ring-like shape whereby thermal expansion of said circumferential rail occurs in directions extending radially outwardly from said surface of the pressure vessel.

16. The rail apparatus of claim 5, wherein said second rail means comprises a plurality of spaced apart, curved rails circumferentially surrounding said surface and joined to each of said elongate rails at said plurality of junctions, said junctions being substantially spaced apart from the upper ends of said elongate rails.

17. The rail apparatus of claim 5, wherein said second rail means comprises a single curved rail circumferentially surrounding said surface and joined to each of said plurality of elongate rails at said plurality of junctions, said junctions being substantially spaced apart from the upper ends of said elongate rails.

18. The rail apparatus of claim 6, wherein said second rail means comprises a plurality of spaced apart, curved rails circumferentially surrounding said surface and joined to each of said elongate rails at said plurality of junctions, said junctions being substantially spaced apart from the upper ends of said elongate rails.

19. The rail apparatus of claim 6, wherein said second rail means comprises a single curved rail circumferentially surrounding said surface and joined to each of said plurality of elongate rails at said plurality of junctions, said junctions being substantially spaced apart from the upper ends of said elongate rails.

20. A rail apparatus for carrying equipment along the surface of a nuclear pressure vessel, comprising:
first rail means including a plurality of resilient, elongate rails disposed along parallel longitudinal axes spaced apart from the surface of a nuclear pressure vessel, for conducting an equipment carriage along said longitudinal axes;
second rail means including a curved rail having an integral, ring-like shape intersecting said first rail means at a plurality of discrete junctions, for conducting said equipment carriage circumferentially around said surface between said longitudinal axes;
means for interconnecting said first rail means to said second rail means at each of said plurality of junctions and for transferring said equipment carriage between said first rail means and said second rail means;
means including radially extending members joined to the upper ends of said elongate rails at locations substantially spaced apart from said junctions, for supporting said first rail means and said second rail means; and
means interposed between a supporting structure and the connected said first and second rail means at positions substantially spaced apart from said upper ends, for preventing oscillation of said connected first and second rail means.

* * * * *